C. D. COYLE.
TROLLEY FOR ELECTRIC RAILWAYS.
APPLICATION FILED NOV. 15, 1909.
960,829.
Patented June 7, 1910.
2 SHEETS—SHEET 1.
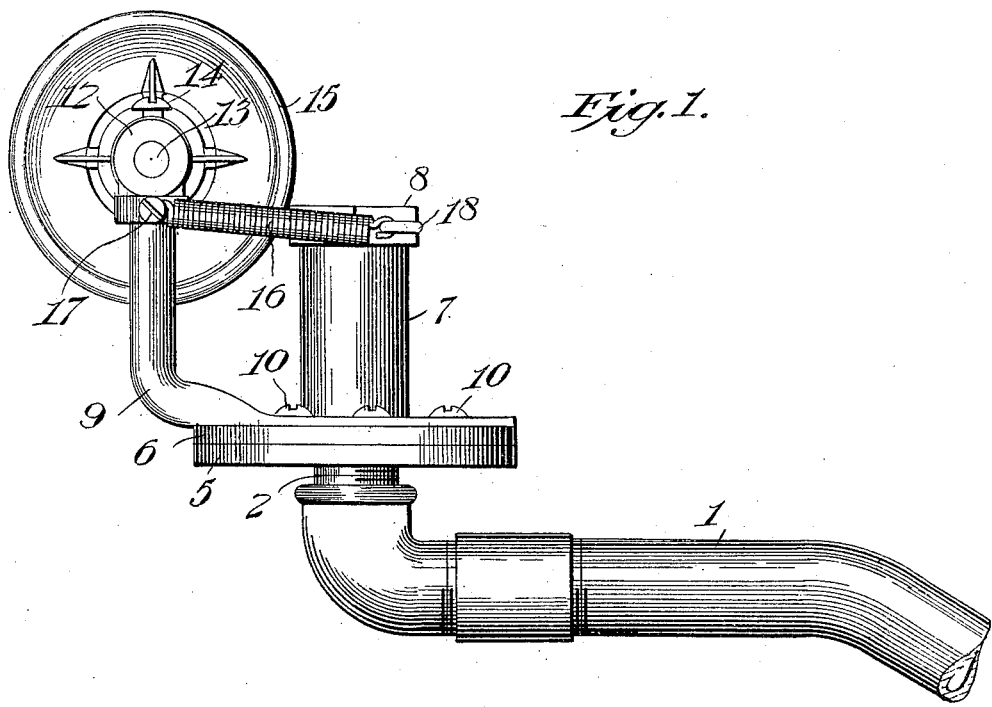
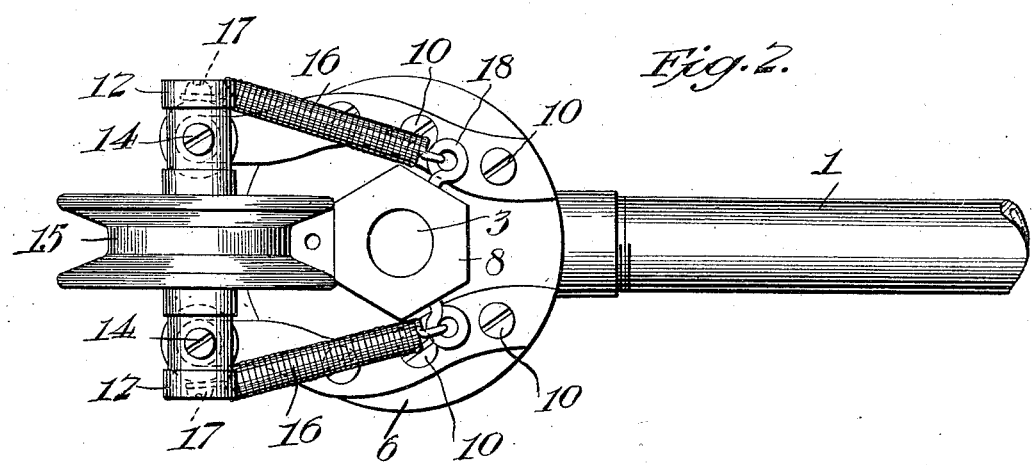

C. D. COYLE.
TROLLEY FOR ELECTRIC RAILWAYS.
APPLICATION FILED NOV. 15, 1909.

960,829.

Patented June 7, 1910.
2 SHEETS—SHEET 2.

Inventor
Clarence D. Coyle

Witnesses

UNITED STATES PATENT OFFICE.

CLARENCE D. COYLE, OF YOUNGSTOWN, OHIO.

TROLLEY FOR ELECTRIC RAILWAYS.

960,829.  Specification of Letters Patent.  Patented June 7, 1910.

Application filed November 15, 1909. Serial No. 528,154.

*To all whom it may concern:*

Be it known that I, CLARENCE D. COYLE, a citizen of the United States, residing at Youngstown, in the county of Mahoning and State of Ohio, have invented certain new and useful Improvements in Trolleys for Electric Railways, of which the following is a specification.

This invention relates to the subject of trolleys for electric railways, and particularly to a novel and practical mounting for a trolley harp, whereby the trolley wheel is permitted to readily and freely adapt itself to the wire on curves and crossover switches with a minimum amount of wear on both the wheel and the wire, and without danger of the wheel leaving the wire.

A further object of the invention is to provide a swiveled trolley harp mounting which is entirely self-adjusting to the run of the wire regardless of the direction in which the pole is deflected from the line of the wire. Also, the improved mounting involves means for normally holding the trolley in a centered position with respect to a straight line of travel under spring tension, and to return the wheel to such centered position when swung to either side of the longitudinal plane of the pole.

Another general object of the invention is to provide a substantial and strong mounting and bearing for the various parts of the swivel mounting.

Figure 3:
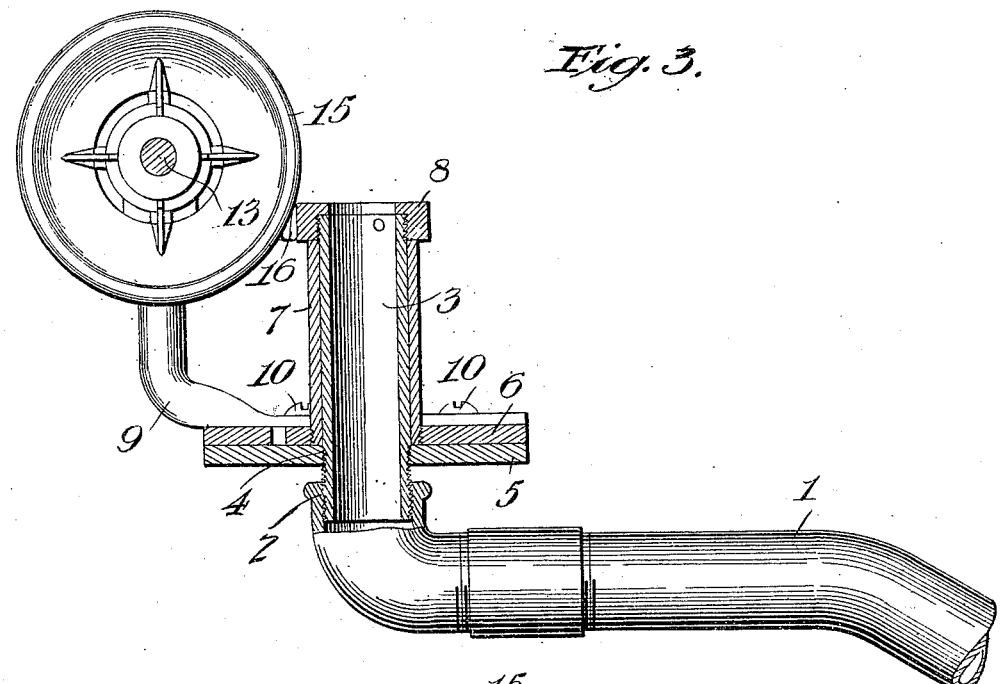
Figure 4:
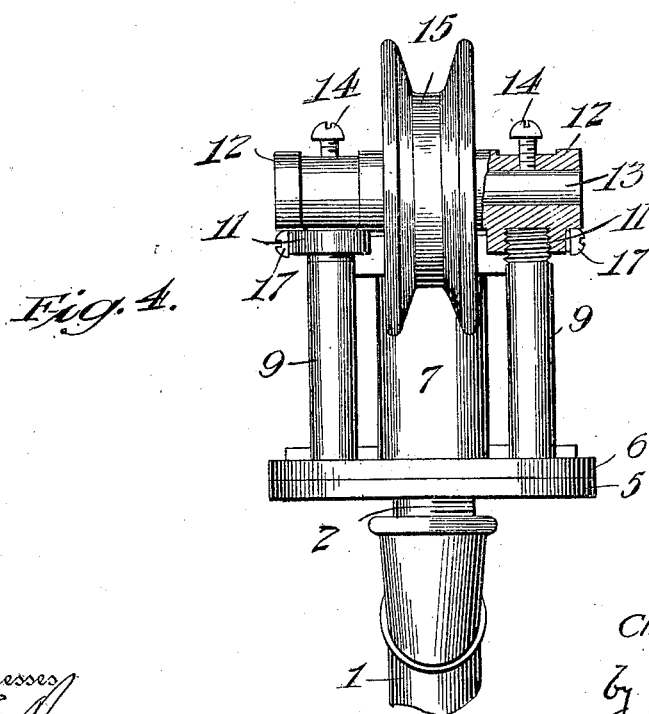

The invention is susceptible to some structural modification without departing from the scope thereof, but a preferred and practical embodiment is shown in the accompanying drawings, in which:

Figure 1 is a side elevation of a trolley harp mounting embodying the present invention. Fig. 2 is a top plan view thereof. Fig. 3 is a vertical sectional view through the swivel bearing. Fig. 4 is an end view of the trolley harp mounting, showing one of the axle boxes in section.

Like references designate corresponding parts in the several figures of the drawings.

The improvements contemplated herein are fitted to a trolley pole 1 of any of the conventional forms in use, and mounted on the car in the usual way. According to the present invention, this pole has threaded or otherwise suitably fitted to the upper end thereof, as at 2, an upright rigid journal post 3 which may consist of a smoothed section of piping, and upon the lower end part of the said post 3, there is threaded or otherwise suitably fitted, as at 4, a wide stationary lower bearing plate 5 upon which is rotatably placed a revoluble upper bearing plate 6 preferably of the same form and dimensions as the stationary plate 5.

The upper bearing plate 6 is rigidly mounted on the lower end of an elongated bearing sleeve 7 journaled on the stationary post 3 and extending nearly the full height of such post in order to provide an extended and substantial swivel bearing. The parts of this swivel bearing are retained in proper working position by means of a retaining nut or equivalent retaining device 8 detachably fitted on the upper end of the post 3, above the upper end of the sleeve 7.

The upper revoluble bearing plate 6 carries the wheel harp consisting of the opposite parallel angled side bearing supports 9, the lower arms of which are screwed or otherwise fastened, as at 10, to the upper side of the plate 6, and the upper extremities of which supports preferably have threaded thereon the collar or socket members 11 of the opposite horizontally alined axle boxes 12. These axle boxes receive therein the ends of the wheel axle 13 held in place by the set screws 14, and which axle has mounted thereon between said boxes a trolley wheel 15 of any approved construction.

Opposite coiled retracting or pull springs 16 are connected respectively to opposite sides of the wheel harp, as at 17, and to opposite sides of the retaining nut 8, as at 18. It will thus be seen that the arrangement of these springs is such as to normally hold the trolley wheel in a centered position with respect to a straight line of travel under spring tension, and to return the wheel to such centered position when swung to either side of the longitudinal plane of the pole.

The other advantages hereinbefore refered to will be apparent from the construction above described.

I claim:

1. In a trolley harp mounting, the pole carrying an upright rigid journal post, a stationary bearing plate arranged at the lower end part of said post, a revoluble bearing plate having a slidable bearing on top of the stationary bearing plate, an upstanding bearing sleeve fast to the revoluble bearing plate and journaled on said post, a wheel harp made fast to the revoluble bearing plate, and oppositely arranged centering springs connected with said harp.

2. In a trolley harp mounting, the pole carrying an upright rigid journal post, a stationary bearing plate fitted to the lower end part of said post, a revoluble bearing plate working over the stationary bearing plate, a bearing sleeve fast to the revoluble bearing plate and journaled on said post, a retaining device at the upper end of the post, a wheel harp made fast to the revoluble bearing plate, and oppositely arranged centering springs connected with opposite sides of the harp, and with the upper end part of the journal post.

In testimony whereof I hereunto affix my signature in the presence of two witnesses.

CLARENCE D. COYLE.

Witnesses:
J. P. FRANCIS,
J. H. HARVEY.